(12) United States Patent
Garcia Sainz et al.

(10) Patent No.: US 6,402,823 B1
(45) Date of Patent: Jun. 11, 2002

(54) INDIVIDUAL INKS AND AN INK SET FOR USE IN THE COLOR INK JET PRINTING OF GLAZED CERAMIC TILES AND SURFACES

(75) Inventors: Javier Garcia Sainz; Carlos Benet Garcia; Jose Luis Fenollosa Romero, all of Castellon; Antonio Manuel Querol Villalba, Segorbe, all of (ES); Patricia C. Secrest, Lakewood, OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/479,350

(22) Filed: Jan. 7, 2000

(51) Int. Cl.⁷ .............................................. C09D 11/00
(52) U.S. Cl. ................ 106/31.95; 106/31.62; 106/31.75; 106/31.86; 106/31.87; 106/31.88; 106/401
(58) Field of Search ............................. 106/31.95, 31.62, 106/31.75, 31.86, 31.88, 31.87, 404, 419, 436, 450, 453, 455, 456, 479, 480, 401; 427/258, 261, 269

(56) References Cited

U.S. PATENT DOCUMENTS

| | | | |
|---|---|---|---|
| 2,407,265 A | 9/1946 | Fox | 260/438 |
| 2,490,399 A | 12/1949 | Ballard | 260/79.7 |
| 2,842,457 A | 7/1958 | Morgan et al. | 117/46 |
| 2,984,575 A | 5/1961 | Fitch | 106/1 |
| 4,143,180 A | 3/1979 | White | 427/145 |
| 4,195,104 A | 3/1980 | Fell | 427/261 |
| 5,003,679 A | 4/1991 | Bartky et al. | 29/25.35 |
| 5,091,003 A | 2/1992 | Boaz | 106/20 |
| 5,112,398 A | 5/1992 | Kruse | 106/20 |
| 5,144,342 A | 9/1992 | Kubota | 346/140 R |
| 5,185,055 A | 2/1993 | Temple et al. | 156/630 |
| 5,189,437 A | 2/1993 | Michaelis et al. | 346/1.1 |
| 5,194,475 A | 3/1993 | Kruse et al. | 524/308 |
| 5,252,764 A | 10/1993 | Lotze et al. | 556/113 |
| 5,273,573 A | 12/1993 | Kappele | 106/22 R |
| 5,273,575 A | 12/1993 | de Saint Romain | 106/23 B |
| 5,361,084 A | 11/1994 | Paton et al. | 347/15 |
| 5,407,474 A | 4/1995 | Airey et al. | 106/20 C |
| 5,443,628 A | 8/1995 | Loria et al. | 106/20 C |
| 5,485,188 A | 1/1996 | Tochihara et al. | 347/100 |
| 5,512,922 A | 4/1996 | Paton | 347/12 |
| 5,538,549 A | 7/1996 | Kato et al. | 106/20 C |
| 5,560,771 A | 10/1996 | Takemoto et al. | 106/22 R |
| 5,663,217 A | 9/1997 | Kruse | 523/161 |
| 5,684,515 A | 11/1997 | Ho | 347/2 |
| 5,698,018 A | 12/1997 | Bishop et al. | 106/31.75 |
| 5,714,236 A | 2/1998 | Withington et al. | 428/195 |
| 5,738,716 A | 4/1998 | Santilli et al. | 106/31.77 |
| 5,743,946 A | 4/1998 | Aoki et al. | 106/31.95 |
| 5,749,951 A | 5/1998 | Yoshiike et al. | 106/31.27 |
| 5,808,642 A | 9/1998 | Zaba et al. | 347/74 |
| 5,837,046 A | 11/1998 | Schofield et al. | 106/31.86 |
| 5,842,258 A | 12/1998 | Harvey et al. | 29/25.23 |
| 5,843,219 A | 12/1998 | Griffin et al. | 106/31.88 |
| 5,855,655 A | 1/1999 | Nohr et al. | 106/31.27 |
| 5,888,284 A | 3/1999 | Engel | 106/31.27 |
| 5,948,471 A * | 9/1999 | Zimmer | 427/218 |
| 5,954,866 A | 9/1999 | Ohta et al. | 106/31.89 |
| 6,068,692 A * | 5/2000 | Zimmer | 106/426 |
| 6,221,140 B1 * | 4/2001 | Kobayashi et al. | 106/31.43 |

* cited by examiner

Primary Examiner—C. Melissa Koslow
Assistant Examiner—Veronica F. Faison
(74) Attorney, Agent, or Firm—Rankin, Hill, Porter & Clark LLP

(57) ABSTRACT

Individual inks and an ink set for use in generating intermediate colors via the combination of separate inks applied by an ink jet printer to the glazed surface of an article, such as glazed ceramic architectural tile for example, that is to be heated to a temperature of greater than 300° C. The ink set according to the present invention includes at least three separate inks that upon heating decompose to form colored oxides or colored combinations with the materials of the glazed surface upon which they are applied. A first ink of the ink set includes a soluble cobalt complex for use in forming a cyan color. A second ink of the ink set includes a soluble gold complex for use in forming a magenta color. And, a third ink of the ink set includes a soluble transition metal complex for use in forming a yellow color. The third ink preferably includes a soluble praseodymium complex. Alternatively, the third ink includes a blend of soluble chromium and antimony complexes and/or soluble nickel and antimony complexes. The ink set also preferably includes a fourth ink including a soluble ruthenium complex for use in forming a black color. The inks preferably contain no suspended solids and are preferably water immiscible. The invention also provides a method of decorating a glazed article using the inks of the ink set, and an article having a decoration applied to at least one glazed surface thereof.

56 Claims, No Drawings

INDIVIDUAL INKS AND AN INK SET FOR
USE IN THE COLOR INK JET PRINTING OF
GLAZED CERAMIC TILES AND SURFACES

FIELD OF INVENTION

The present invention relates to individual inks and an ink set for use in the color ink jet printing of glazed articles that are to be subjected to high temperatures such as, for example, ceramic tiles, a method of decorating glazed articles using the inks of the ink set, and glazed articles having ink jet printed decorations formed thereon.

BACKGROUND OF THE INVENTION

Articles that are subjected to high temperatures during processing such as, for example, glazed ceramic tiles, are conventionally decorated by serigraphic screen printing or roller processes, which are well known. Articles are decorated in this manner by the sequential application of pastes that contain solid milled colored pigments and/or glasses suspended in a liquid carrier. After the pastes have been applied or transferred to the surface of the article, the article is heated to high temperatures, typically from about 500° C. to about 1,250° C., for several minutes to melt the glasses and incorporate the color-forming solids onto the surface of the ceramic article and to burn off the liquid carrier.

Serigraphic screen printing and roller processes are well suited for some applications such as, for example, single-color decoration of glazed ceramic tiles. However, such processes are not particularly well suited for generating complex multicolor decorations because separate pastes and separate screens are usually required for each color used in the decoration. While it is possible in some cases to generate intermediate colors using serigraphic screen printing or roller processes by combining by overprinting two or more pastes from a set of subtractive complementary color pastes, such intermediate colors tend to vary widely in color and quality from piece to piece because it is very difficult to consistently position sequential screens or patterns on an object and apply precise amounts of paste. Moreover, the overprinted combinations of different color pigments do not always produce satisfactory colors on glazed ceramic tiles and surfaces. Due to these limitations, intermediate colors are conventionally generated in serigraphic screen printing and roller processes by applying a paste of the desired color.

One of the printing processes that can be used to generate consistent high quality multicolor decorations is color ink jet printing. In the process of color ink jet printing, which is well known, intermediate colors are generated on the surface of articles that are to be exposed only to relatively low temperatures such as, for example, sheets of paper, by closely printing small dots of at least two inks from an ink set that commonly includes at least three inks for producing the standard subtractive complementary cyan ("C"), magenta ("M"), and yellow ("Y") colors. Ink sets of this type are conventionally referred to as CMY ink sets. To the unaided human eye, the closely printed small dots of the subtractive complementary colored ink appear to be high quality intermediate colors such as red, green, blue, orange, and brown. However, when viewed under magnification, it is usually possible to identify discrete dots of the subtractive complementary colored inks which may or may not actually overlap.

Typically, ink sets for use with color ink jet printers for low temperature objects (such as paper) also include an ink for producing the color black ("K") as opposed to generating black by combination of other inks of the ink sets. Ink sets of this type are conventionally referred to as CMYK ink sets. A black ink is included in these ink sets because black is usually the most frequently printed color on low temperature articles, such as sheets of paper, and including a black ink in the ink set avoids the necessity and expense of using the other inks of the ink set to form a black color. Furthermore, a better and more intense black color is usually obtained using a black ink than by combination of the other inks of the ink set.

It would be highly advantageous to be able to decorate high temperature articles, such as glazed ceramic tile and other glazed articles, using color ink jet printing technology. Color ink jet printing is a non-contact process that could significantly reduce loss due to breakage in production of decorated glazed ceramic tiles or articles, which would thus reduce the amount of waste generated during such processes. Another advantage of color ink jet printing is that instant design changes are possible by changing the software command signal that is sent to the print head, thus increasing the speed and efficiency of the process of developing new tile decoration designs. By contrast, with the currently used serigraphic screen printing decoration technology, new screens must be created and properly aligned and a new coloring paste prepared every time a design change is made. Thus, the changing of designs and colors with conventional screen printing and roller processes is costly and time consuming.

Inks conventionally used in the color ink jet printing of articles that are exposed only to low temperatures, such as sheets of paper, cannot be used on articles that are to be subjected to high temperatures, such as glazed ceramic tiles, because the organic color producing pigments in such conventional inks decompose when exposed to temperatures greater than 300° C. for more than a few minutes. Similarly, pastes conventionally used in the serigraphic screen printing of articles that are to be subjected to high temperatures, such as glazed ceramic tiles, cannot be used in ink jet printers because such pastes are too viscous and contain high loadings of suspended colorforming solids which tend to sediment.

Airey et al., U.S. Pat. No. 5,407,474, discloses inks containing solid inorganic pigments that can be applied to high temperature articles using an ink jet printer, but it has been found that it is difficult to precisely control the application of such inks. Inks which are based upon the suspension of inorganic solids in solution are not stable due to the large difference between the density of the inorganic solid and the solution in which they are suspended. Moreover, such inks also require a relatively high loading of inorganic color producing solids in order to achieve satisfactory color intensities, thus further complicating their use in ink jet printers. It is known that the size and size distribution of solids included in inks used in ink jet printing is critical, as the working lifetime of the ink jet print head is significantly reduced by clogging, especially if there are particles that are too large to pass through the nozzles. It is also known that even very small solid particles can agglomerate to form larger particles, again causing sedimentation of the ink and clogging of the nozzles of the print head. de Saint Romain, U.S. Pat. No. 5,273,575, discloses several ink compositions that can be applied using an ink jet printer to articles that are to be subjected to temperatures greater than 300° C. These ink compositions contain water soluble metallic salts which, after decomposition by heat, form colored oxides or colored combinations with the material of the article upon which they are deposited. Several ink compositions are disclosed in the examples in de Saint Romain that can be used to form the colors black, gray, green, blue, brown, and gray-blue on the surface of various ceramic surfaces, the color obtained being dependent upon the composition of the article and the firing temperature employed. Although de Saint Romain discloses several ink compositions that can be applied to high temperature articles using an ink jet printer, de Saint Romain does not teach or suggest that the ink compositions can be used on glazed surfaces. Moreover, de Saint Romain does not teach or suggest that the ink compositions can be used in combination to form a subtractive complementary color set capable of forming intermediate colors for decoration. Moreover, de Saint Romain does not disclose any ink compositions that can be used to form the colors magenta, yellow, or a high quality black on a glazed article, which would be essential components of any CMY ink set and/or a CMYK ink set to be used on such a surface.

In addition to being water soluble, all of the ink compositions disclosed in the examples in de Saint Romain are water miscible. It is known that water miscible inks are susceptible to unwanted migration upon exposure to water, including any residual humidity in the article upon which the inks would be printed and/or atmospheric humidity to which the article would be exposed before firing. Accordingly, the ink compositions disclosed in the examples in de Saint Romain tend to be susceptible to diffusion on the surface of the article being printed when exposed to moisture, which causes a loss of resolution and a loss of color intensity of the applied design. This makes the inks according to de Saint Romain particularly unsuitable for use on glazed articles, because most glazes are conventionally applied by wet aqueous spraying techniques.

One method of inhibiting diffusion of applied water soluble inks is disclosed in European Patent Application, de Saint Romain et al. EP 0 572 314 A1. In that process, wet ceramic surfaces are first sprayed with a solution that causes subsequently applied color-producing water soluble metal salts to precipitate onto the ceramic surface. This process, while being somewhat effective in prohibiting the diffusion of applied inks due to the presence of water, disadvantageously requires the separate application of two solutions to the surface of the ceramic article in order to cause the precipitation of the metal salt, thus slowing any printing process. Again, this patent fails to teach or suggest the application of inks to a glazed surface.

A need exists for individual inks and an ink set that can be used to generate a wide variety of colors via the application of separate inks from the ink set using an ink jet printer to the glazed surface of an article that is to be heated to a temperature of greater than 300° C. The ink set should include inks for forming the subtractive complementary colors cyan, magenta, and yellow, which can be combined to produce a useful range of intermediate colors including orange, red, green, blue, and brown, when the article upon which they have been applied is fired at a temperature from about 500° C. to about 1,300° C. The ink set should preferably also include a black ink. Moreover, the inks of the ink set should preferably be immiscible in water so as to inhibit diffusion due to exposure to residual and/or atmospheric humidity when applied to the glazed surface of an article, such as a glazed ceramic tile, that is to be heated to high temperature.

SUMMARY OF THE INVENTION

The present invention provides individual inks and an ink set comprising at least three separate inks for use in generating a wide variety of colors by combination of the inks applied by an ink jet printer to the glazed surface of an article that is to be heated to a temperature of greater than 300° C. The first ink of the ink set according to the present invention comprises a soluble cobalt complex for use in forming a cyan color. The second ink of the ink set according to the present invention comprises a soluble gold complex for use in forming a magenta color. And, the third ink of the ink set according to the present invention comprises a soluble transition metal complex for use in forming a yellow color. In a preferred embodiment, the third ink comprises a soluble praseodymium complex for use in forming a yellow color when it is heated in the presence of zirconium, which is preferably included in the material of the glaze applied to the surface of the article, or less preferably as a zirconium complex in the ink, or both. Alternatively, the third ink comprises a blend of a soluble chromium complex and/or a soluble nickel complex with an antimony complex for use in forming a yellow color when it is heated in the presence of titanium, which is preferably included in the material of the glaze applied to the surface of the article, or less preferably as a titanium complex in the ink, or both. In a preferred embodiment, the ink set of the present invention further includes a fourth ink comprising a soluble ruthenium complex for use in forming a black color.

The inks of the ink set can be used to form a broad range of intermediate colors such as, for example, orange, red, green, blue, and brown, when the glazed article upon which they have been applied is fired at a temperature greater than 300° C., and more preferably from about 500° C. to about 1,300° C. The colors produced using the ink set have excellent color intensity and high resolution. Moreover, the colors produced using the ink set of the present invention do not fade or degrade over time, and do not degrade upon exposure to solvents and acidic and basic solutions. When the inks are applied to glazed ceramic tiles, the colors produced become part of the glaze and thus exhibit the same degree of chemical and mechanical resistance as the glaze.

Preferably, the inks of the ink set do not contain any solids in suspension, which can cause sedimentation of the ink and can clog the nozzles of ink jet printing heads.

Moreover, the inks of the ink set according to the present invention preferably are not miscible with water and thus do not migrate on the surface of the article being printed upon exposure to residual and/or atmospheric humidity. The inks of the ink set according to the present invention can be used to generate complex multicolor designs using ink jet printing technology that have extremely fine detail on glazed articles that are to be subjected to temperatures greater than about 300° C.

The present invention also provides a novel method of decorating the surface of a glazed article that is to be heated to a temperature greater than 300° C. with at least one intermediate color using an ink jet printer. The method of the present invention comprises providing an ink set comprising at least a first ink comprising a soluble cobalt complex for use in forming a cyan color, a second ink comprising a soluble gold complex for use in forming a magenta color, and a third ink comprising a soluble transition metal complex for use in forming a yellow color, applying the inks of the ink set to the surface of a glazed surface of the article using an ink jet printer so as to closely print a density of dots of at least two of the inks where the intermediate color is desired, and heating the printed glazed article to a temperature of greater than about 300° C. to form the desired decoration on the glazed surface of the article.

The present invention also provides a novel high temperature article, particularly a glazed ceramic tile, having an image including at least one intermediate color formed thereon by ink jet printing using an ink set comprising at least a first ink comprising a soluble cobalt complex for use in forming a cyan color, a second ink comprising a soluble gold complex for use in forming a magenta color, and a third ink comprising a soluble transition metal complex for use in forming a yellow color. In a preferred embodiment, the ink set further comprises a fourth ink for use in forming a black color.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE PREFERRED EMBODIMENTS

The ink set according to the present invention comprises at least three separate inks, with each ink comprising one or more soluble transition metal complexes (i.e., coordination complex compounds including a metal ion and a suitable ligand) that form colored oxides or colored combinations with the materials of a glaze that has been applied to the surface of an article that is to be heated to a temperature of greater than 300° C. The ink set according to the present invention includes at least a first ink for use in forming a cyan color (C), a second ink for use in forming a magenta color (M), and a third ink for use in forming a yellow color (Y), which together form a CMY color set. In a preferred embodiment, the ink set further includes a fourth ink for use in forming a black color (K), which together with the other inks forms a CMYK color set. The inks of the ink set according to the present invention are particularly useful for generating a broad range of colors including various shades of cyan, magenta, yellow, red, green, blue, orange, and brown.

The essential colors of the inks used in the ink set are the subtractive complementary colors: cyan (C); magenta (M); and yellow (Y). These colors are the critical colors in any color printing process which generates intermediate colors by color synthesis. A single subtractive complementary colored ink produces its own color. Two subtractive complementary colors in equal strength produce an intermediate primary color because each absorbs a primary (e.g., magenta and yellow absorb green and blue, respectively, leaving only red to be seen). Various combinations of unequal strengths of the subtractive complementary colors produce a broad range of intermediate colors. Usually, the subtractive complementary colorants are applied as dots, and by varying the density of the applied dots, the intensity and color as it appears to the unaided eye can be adjusted. A combination of all three subtractive complementary colors in full strength should, theoretically, produce a black color because all intermediate colors would be subtracted. However, it is rarely economical and/or feasible to form a black color in this manner in practice, so most CMY color sets usually also contain a black (K) colorant for use in producing black and other very dark colors. A black ink is also useful for adjusting the intensity of other applied colors.

The following definitions are used throughout the specification and in the appended claims, unless the context clearly indicates otherwise: "intermediate color" means a color produced by any combination of strengths or amounts of two or more of the subtractive complementary colors; "by combination" means that the inks from the ink set have been separately applied as discrete dots in a desired density to the glazed surface of the article, whether or not the dots overlap, so as to produce an intermediate color as viewed by the unaided human eye after the article has been fired; and "dot" or "drop" means a spot or droplet of ink that has been deposited on the glazed surface of an article by an ink jet printer. It will be appreciated that intermediate colors can be generated by combination even where the applied dots of subtractive complementary colored ink do not overlap because the dots appear to be intermediate colors to the unaided eye.

The inks of the ink set are designed to be applied to the glazed surface of an article that is to be heated to a temperature of greater than 300° C., such as, for example, a glazed ceramic tile, using ink jet printing technology, which is well known.

The specifications of Kubota, U.S. Pat. No. 5,144,342, which discloses a drop-on-demand ink jet printing head, and Zaba et al., U.S. Pat. No. 5,808,642, which discloses a continuous ink jet printing head, are hereby incorporated by reference for their teachings relative to the art of ink jet printing and the various devices that are used to accomplish the same.

The term "glazed surface of an article" as used in the specification and in the appended claims refers to the surface of an article upon which a glaze or enamel composition has been applied, but not fired. There are many standard glaze and enamel compositions known in the art that upon heating form transparent to opaque vitreous glass finishes on the surface of an article to which they have been applied.

The inks of the present invention are especially well-suited for use in decorating glazed ceramic tile in a single fast firing cycle. Green ceramic tile bodies are glazed in a conventional manner, such as by wet spraying. The glaze composition is dried and then decorated using an ink jet printer and the inks of the ink set according to the present invention. The decorated glazed ceramic tile is preferably then fired in a single fast firing cycle to produce the finished product.

As previously noted, each of the individual inks in the ink set comprises one or more transition metal complexes. Transition metal complexes are formed between a metal ion, usually acting as a cation or an electron pair acceptor, and a ligand, usually acting as an electron pair donor, bonding to the metal ion. Ligands are most commonly bound to metals through heteroatoms (e.g., N, O, P, S, etc.). Carbon can also bind directly to metals, especially with those in lower oxidation states, such as in metal carbonyl complexes.

Because the ligand decomposes when the transition metal complex is heated to generate the desired color, the choice of ligand is not per se critical to the invention and a wide range of ligands can be used. The choice of ligand will be depend upon factors such as the particular transition metal ion needed for the ink, the composition and characteristics of the article upon which the ink is to be applied, the toxicity of the ligand, handling and storage considerations, cost, and the solubility of the resulting transition metal complex in solvents that can be used in ink jet printing devices.

Water insoluble metal carboxylates are the presently the preferred soluble transition metal complexes for use in the invention, and more particularly metal carboxylates containing 5 to 22 carbon atoms. Suitable examples include longer carbon chain aliphatic and aromatic carboxylates such as laurates, stearates, oleates, linoleates, hexanoates, octanoates, octoates, decanoates, benzoates, phthalates, and napthenates. The most preferred water insoluble carboxylates for use in the invention are presently the metal salts of hexanoic acid, octanoic acid, 2-ethylhexanoic acid, decanoic acid, dodecanoic acid (lauric acid), stearic acid, benzoic acid, and phthalic acid, because such compounds are readily and commercially available and/or relatively simple to synthesize, present relatively few safety, handling, and storage problems, and are relatively inexpensive when compared to other transition metal complexes that can be used in the invention. Moreover, these compounds are soluble in organic solvents that have low or no volatility and have viscosities that allow them to be used in conventional ink jet printers. Moreover, water insoluble metal carboxylates are particularly preferred for preparing the inks of ink sets used in decorating hydrophilic articles such as glazed ceramic tiles. Because these compounds are immiscible in water, they do not migrate on the surface of the glazed ceramic tiles due to exposure to residual and/or atmospheric humidity. Also, the use of a water immiscible transition metal complex solution avoids the necessity of an additional application step to prevent diffusion of a water miscible based ink solvent system.

Although water insoluble metal carboxylates are presently the preferred soluble transition metal complexes for use in the invention, other soluble transition metal complexes can be used to provide an ink set in accordance with the invention. Suitable examples include: water soluble metal carboxylates such as, for example, acetates, citrates, lactates, tartrates, oxalates, ascorbates, and succinates; metal alkoxides such as, for example, methoxides, ethoxides, propoxides, and butoxides; β-diketonates, especially acetyl acetonates (2,4-pentanedionates); chelates, especially ethylendiammine tetraacetic acid; and resinates such as, for example, the α-pinene, α-terpineol, β-pinene mercaptans, dipentene, terpinolene, menthene, junipene, and camphene. Combinations of different ligands on the same transition metal can be used to enhance stability of the complex and/or its solubility in the desired solvent.

It will be appreciated that alkoxides are organic soluble and water sensitive, and in some cases can decompose from ambient moisture. β-diketonates are well known as starting materials for many organotransition metal syntheses and are particularly soluble in tetrahydrofuran and acetonitrile, and can also be used to stabilize some alkoxide complexes. Esters and aldehydes can also chelate or ligate through the C=O multiple bond, but these ligands are usually more common for lower oxidation state metals. Complexes in which the metal ions are bound through phosphorous are generally to be avoided due to the toxicity of the ligands and the smell. However, many of the known transition metal phosphine complexes can be used in the invention. Transition metal amine complexes such as ethylenediamine, diethylenetriamine, pyridines and bipyridines are also well known for many transition metals and could be used in this invention, but again many are toxic, expensive, and have a strong unpleasant odor. Many of the sulfur analogs to oxygen chelating ligands such as dithiocarbamates, dithiophosphines, and mercaptosuccinates, can be used in the invention. Other suitable transition metal complexes include halides and soluble carbonyl complexes. It will be appreciated that some of the readily available water soluble salts such as the nitrates, halides and sulfates are less preferred because they can generate potentially toxic by-products (e.g., $NO_x$, $X_2$, and $SO_x$) during the firing process.

The soluble transition metal complexes used to form the individual inks according to the invention can easily be synthesized by processes which are well-known. However, it will be appreciated that the soluble transition metal complexes used in the invention can more conveniently be purchased from a number of suppliers including, for example, Aldrich Chemical Company of Milwaukee, Wis., Strem Chemicals of Newburyport, Mass., Alfa Aesar of Ward Hill, Mass., Fisher Scientific of Pittsburgh, Pa., and OM Group of Cleveland, Ohio. Such soluble transition metal complexes are widely available from a number of suppliers because they are used in other industrial processes such as driers for promoting or accelerating the drying, curing, or hardening of oxidizable coating vehicles, such as paints. They are also used in waterproofing agents, rubbers, greases, lubricants, chemical thickeners, stabilizers for plastics, fungicides, catalysts, fuel additives, and in cosmetics and pharmaceuticals.

The individual inks of the ink set according to the present invention comprise one or more soluble transition metal complexes that are preferably dissolved in one or more solvents. Presently, the most preferred solvents for use in the invention are non-polar hydrocarbons, including aromatics, that are compatible with the preferred water insoluble metal carboxylates. Suitable examples include benzene, toluene, xylenes, terpintines, and aromatic petroleum distillates. These solvents tend to have higher boiling points, lower volatility, and better solubility for transition metal complexes than saturated hydrocarbons. Moreover, these solvents are not miscible with water.

Although unsaturated hydrocarbons, including aromatics, are presently the most preferred solvents for use in the invention, other solvents can be used. Water can be used as a solvent for water soluble transition metal complexes. Likewise, saturated and unsaturated aliphatic hydrocarbons can be used with compatible organic soluble transition metal complexes. Suitable examples of aliphatic saturated hydrocarbons which can be used as solvents in the invention include pentane, hexane, heptane, octane, hexacosane, and various fractions of petroleum distillates such as petroleum ethers, ligroins, and mineral spirits. Generally speaking, as the molecular weight of the hydrocarbon solvent increases, the boiling point increases and metal-organic complexes become more soluble. However, this is not an absolute rule, as the solubility of organic soluble transition metal complexes is variable depending on such factors as choice of ligand, metal oxidation state and the polarity of the solvent. Cyclic saturated hydrocarbons such as cyclohexane can also be used in the invention, and these solvents are not miscible with water.

Ethers can also be used as solvents in the invention with compatible soluble transition metal complexes. Suitable ethers for use as solvents in the invention include, for example, diethyl ether, tetrahydrofuran, dimethoxyethane, and n-butyl ether. Ethers have a wide range of boiling points and polarities, and many transition metal complexes are soluble in ethers. While ether solvents are generally not miscible in water, they are not preferred for use in the invention because they can develop explosive organic peroxides if stored for long periods of time.

Esters, such as, for example, ethyl acetate and n-butyl acetate, can be used as solvents for many transition metal complexes. These solvents are generally not miscible with water, and are widely available due to their widespread use in industrial solvent applications.

Ketones, such as, for example, acetone, methylethylketone, and cyclohexanone, can be used as solvents for many transition metal complexes. Some of these solvents, however, are miscible with water, and some are quite volatile.

Alcohols, such as, for example, methanol, ethanol, n-propanol, iso-propanol, n-butanol, sec-butanol, tert-butanol, hexanol, octanol, and aromatic alcohols, can be used as solvents for some transition metal complexes. It will be appreciated that alcohols vary widely in terms of polarity, solubility of transition metal complexes, volatility, and miscibility with water. Some alcohols are soluble in water whereas others, particularly the alcohols with longer carbon chains, such as octanol, are not soluble in water.

Other suitable solvents include, for example, acetonitrile, halogenated hydrocarbons, and dimethylsulfoxide. However, industrial use of some of these solvents is being phased out in some countries due to health and environmental concerns. Moreover, some of these solvents tend to be quite expensive, toxic, and some are miscible with water.

The first ink of the ink set according to the present invention comprises a soluble cobalt complex for use in forming a cyan color. In a presently most preferred embodiment, the soluble cobalt complex comprises a cobalt carboxylate complex, and more preferably a cobalt carboxylate complex containing 5 to 22 carbon atoms. Preferred examples include cobalt 2-ethylhexanoate, cobalt octanoate, cobalt laurate, and cobalt stearate. These cobalt carboxylate complexes are soluble in many organic solvents including aromatic solvents such as xylene, which is a particularly desirable solvent for ink jet printing. Inks based upon cobalt carboxylates that can be dissolved in aromatic solvents are water immiscible, exhibit relatively low toxicity, have a relatively high metal ion loading relative to size (molecular weight) of ligand, and have a viscosity that is compatible with most known ink jet printing devices. Although the above mentioned cobalt carboxylates are presently most preferred, it will be appreciated that, as discussed above, other soluble cobalt complexes can alternatively be used in the invention. In addition to the soluble cobalt complex, the first ink can further comprise other soluble transition metal complexes wherein the metal ion comprises one or more selected from the group consisting of bismuth, cerium, chromium, copper, iron, manganese, nickel, praseodymium, tin, titanium, vanadium, zinc, and zirconium, to modify and/or correct the tone and intensity of the cyan color produced upon heating. The method of preparing the soluble cobalt complex is not per se critical, and any of the various methods of synthesizing such compounds, which are well known, can be used in the invention.

The second ink of the ink set comprises a soluble gold complex for use in forming a magenta color. In the presently most preferred embodiment, the soluble gold complex comprises a gold resinate or gold dodecylmercaptide. However, as noted above, other soluble gold complexes can alternatively be used in the invention such as: carboxylates (particularly octanoates, hexanoates, stearates, benzoates, phthalates, naphthates, and laurates); chelates; β-diketonates (particularly acetylacetonates); resinates such as terpineols, pinenes, and their respective mercaptans; phosphines, and alkoxides. The term "soluble gold complex" as used in this specification and in the appended claims should be understood to also include colloidal gold dispersions. The soluble gold complex can be combined in solution with other soluble transition metal complexes wherein the metal ion comprises one or more selected from the group consisting of aluminum, antimony, bismuth, chromium, copper, iron, manganese, molybdenum, nickel, silicon, tin, titanium, tungsten, vanadium, yttrium, zinc, and zirconium, to obtain a magenta ink at lower cost and to modify and/or correct the tone and intensity of the magenta color formed upon heating.

The third ink of the ink set comprises a soluble transition metal complex for use in forming a yellow color. In the presently most preferred embodiment, the soluble transition metal complex of the third ink comprises a praseodymium 2-ethylhexanoate. However, as noted above, other soluble praseodymium complexes can alternatively be used in the invention, such as: carboxylates (particularly octanoates, hexanoates, stearates, benzoates, phthalates, napthenates, and laurates); chelates; β-diketonates (particularly acetyl acetonates); resinates, and alkoxides. The soluble praseodymium coordination complex can be combined in solution with other soluble transition metal complexes wherein the metal ion comprises one or more selected from the group consisting of antimony, cerium, chromium, iron, lead, molybdenum, nickel, niobium, tin, titanium, tungsten, vanadium, zinc, and zirconium, to modify and/or correct the tone and intensity of the yellow color. The method of preparing the soluble praseodymium complex is not per se critical, and any of the various methods of synthesizing such compounds, which are well known, can be used in the invention.

In order for a yellow color to be developed from a soluble praseodymium complex upon heating, it is necessary to have zirconium present. Without the presence of zirconium, a praseodymium silicate green color can be produced. The source of the zirconium necessary for yellow color formation is not per se critical. Zirconium can be present in the glaze material applied to the article being printed and/or it can be included as a component of the third ink such as, for example, a zirconium complex. Preferably, zirconium is present in the glaze material applied to the article being printed, either inherently, or as an additive to the glaze/enamel that has been applied to the article prior to being printed. A more intense yellow is obtained when the zirconium is present in the glaze material applied to the surface of the article being printed than when the zirconium is present as a component of the ink.

A zirconium enriched glaze/enamel that can be applied to the surface of articles to be printed comprises from about 40% to about 100% by weight of a conventional transparent or white glaze or enamel forming glass frit to which has been added, either as a component of the glass frit or as a separate mill addition, from about 0% to about 30% by weight zirconium oxide, $ZrO_2$, and/or from about 0% to about 30% by weight zirconium silicate, $ZrSiO_2$. The quantity of this zirconium enriching glaze/enamel which must be applied per square meter of surface of the article will depend upon the firing cycle and maximum firing temperature, but it will usually vary within the range of from about 25 $g/m^2$ to about 1,000 $g/m^2$.

As an alternative to a praseodymium based ink, the third ink of the ink set can comprise a blend of soluble chromium and antimony complexes and/or a blend of soluble nickel and antimony complexes, together with a source of titanium, which can be present in the ink as a soluble titanium complex and/or present in the glaze material applied to the surface of the article being printed as $TiO_2$. Presently, the most preferred embodiment for this alternative formulation of the third ink of the ink set comprises a blend of chromium 2-ethylhexanoate and/or nickel 2-ethylhexanoate, triphenyl antimony or other aromatic solvent soluble antimony, and titanium isopropoxide or other titanium alkoxide. As noted above, it will be appreciated that blends of other soluble chromium, antimony, and titanium complexes can be successfully used in this alternative embodiment of the invention, such as carboxylates (particularly octanoates, hexanoates, stearates, and laurates), chelates, β-diketonates (particularly acetyl acetonates), resinates, alkoxides, and carbonyls. The blend of soluble chromium and antimony complexes and/or the blend of nickel and antimony complexes, whether containing soluble titanium complexes or not, can be combined in solution with other soluble transition metal complexes wherein the metal ion comprises one or more selected from the group consisting of antimony, cerium, chromium, iron, lead, manganese, molybdenum, nickel, niobium, praseodymium, tin, titanium, tungsten, vanadium, yttrium, zinc, and zirconium, to modify and/or correct the tone and intensity of the yellow color.

Inks formed from a blend of soluble chromium, antimony, and titanium complexes and/or soluble nickel, antimony, and titanium complexes do not need the presence of any other components to develop a yellow color. However, when a soluble titanium complex is not present as a component of the ink, $TiO_2$ must be present in the glaze material applied to the surface of the article being printed. The yellow color formed according to this alternative embodiment tends to be more intense than the yellow color formed using the preferred praseodymium based ink. However, the yellow colors formed from inks according to this alternative embodiment of the invention tend to be more buff toned (i.e., more orangish) than the yellow colors formed using the preferred praseodymium based ink.

Unlike conventional low temperature organic pigment CMY ink sets, the inks of the ink set for use in the color ink jet printing of high temperature glazed ceramic articles according to the present invention cannot be combined to obtain a high quality black color. While a three ink CMY ink set according to the present invention is useful for many applications, more preferably the ink set according to the present invention further includes a fourth ink comprising a soluble ruthenium complex for use in forming a black color, or for use in adjusting the tone and intensity of other applied colors. In the presently most preferred embodiment of the fourth ink, the soluble ruthenium complex comprises ruthenium 2-ethylhexanoate. However, as noted above, other soluble ruthenium complexes can alternatively be used in the invention, such as carboxylates (particularly octanoates, hexanoates, stearates, and laurates), chelates, β-diketonates (particularly acetyl acetonates), resinates, amines, phosphines, carbonyls and alkoxides. The soluble ruthenium complex can be combined in solution with other soluble transition metal complexes wherein the metal ion comprises one or more selected from the group consisting of antimony, chromium, cobalt, copper, gold, iridium, iron, manganese, molybdenum, nickel, palladium, platinum, tin, titanium, tungsten, and vanadium, to lower the cost of the ink and/or to modify and/or correct the tone and intensity of the black color. A black ink can also be used to adjust the intensity of another applied color.

To formulate the inks of the ink set according to the present invention such that they can be applied to an article using an ink jet printer, the inks should have an appropriate density, viscosity, and surface tension. The viscosity of the inks must be within the range of from about 5 centipoise to about 50 centipoise, and more preferably from about 5 centipoise to about 20 centipoise. The surface tension should be within the range of from about 20 mN/m to about 40 mN/m. And, the density of the inks should preferably be within the range of from about 0.6 g/mL to about 2.5 g/mL, and more preferably 0.7 g/mL to 1.2 g/mL. The inks can be prepared such that they meet these criteria for ink jet printing by being dissolved in one or more suitable solvents.

While the inks of the ink set according to the present invention are particularly well-suited for application using an ink jet printer, they can be applied to the glazed surface of an article by other processes such as, for example, screen printing and roller processes. When used in this manner, the viscosity, surface tension, and density of the inks must be adjusted to suit the particular application process being used.

Preferably, the solvent or solvents used in the inks of the ink set according to the present invention are not soluble in or miscible with water. It is also preferable that the solvents used to prepare the inks of the ink set have little or no volatility. Preferred solvents for use in the invention include, for example, paraffins, isoparaffins, napthenics, aromatics or aliphatic hydrocarbons, ethers, alcohols, esters and ketones.

The inks of the ink set of the present invention preferably do not contain water or acidic solutions which can corrode and deteriorate ink jet printing heads. Furthermore, the inks of the ink set preferably do not contain solids in suspension which can lead to the sedimentation of the inks and the clogging of ink jet printing heads. Furthermore, the inks of the ink set are preferably not miscible with water, which avoids the penetration of the ink into unfired glaze layer due to residual humidity and inhibiting the diffusion of the applied design due to atmospheric humidity.

The present invention also comprises a novel method of decorating the surface of an article with at least one intermediate color. The method according to the present invention comprises: (1) providing an ink set comprising at least three separate inks, a first ink of the ink set comprising a soluble cobalt complex for use in forming a cyan color, a second ink of the ink set comprising a soluble gold complex for use in forming a magenta color, and a third ink of the ink set comprising a soluble transition metal complex for use in forming a yellow color; (2) applying the inks from the ink set to the glazed surface of an article using an ink jet printer such that at least two of the inks are combined on the surface of the article where an intermediate color is desired; and (3) heating the article to a temperature of greater than 300° C. to decompose the soluble transition metal complexes such that the metal ions form oxides or combinations with the glaze material upon which they are deposited so as to produce the desired intermediate color on the surface of the article when viewed by the unaided human eye.

The inks of the ink set according to the present invention can be applied to the surface of an article using conventional ink jet printing devices, which are well known. Suitable examples of ink jet printing devices are described in the following patents assigned to Xaar Technology Limited of Cambridge, England: Barkley et al., U.S. Pat. No. 5,003,679; Michaelis et al., U.S. Pat. No. 5,189,437; Paton, U.S. Pat. No. 5,512,922; and Harvey et al., U.S. Pat. No. 5,842,258. The inks are preferably deposited as drops on the surface of the article being printed. The volume of ink in each drop will vary depending upon ink jet printer used, but preferably each drop will have a volume of about 80 picoliters of ink. When applied in this manner, a maximum of about 3,500 drops can be applied in a single square centimeter, with a maximum of about 0.00027848 grams of ink being applied per square centimeter (2.7848 $g/m^2$). These numbers depend on the speed and resolution of the printhead. The volume and drop density of the ink can have a significant affect on the resulting color intensity. In addition to meeting the viscosity, surface tension, and density criteria previously described, the inks preferably have no or a very low volatility to prevent solvent evaporation from causing the soluble transition metal complexes to precipitate out of solution and block the nozzles of the ink jet printing head. Furthermore, the inks preferably exhibit a minimum or null electric conductivity. To increase the intensity of the color produced upon heating, drops of ink can be applied in overlapping layers on the surface of the article being printed.

The invention also provides a novel article having an image including at least one intermediate color formed thereon using an ink jet printer and an ink set comprising a first ink comprising a soluble cobalt complex for use in forming a cyan color, a second ink of the ink set comprising a soluble gold complex for use in forming a magenta color, and a third ink of the ink set comprising a soluble transition metal complex for use in forming a yellow color. In a preferred embodiment, the article comprises a glazed ceramic tile. In the most preferred embodiment, the article has an image formed thereon that includes a black color that was formed using an ink jet printer and an ink set that also included a fourth ink comprising a soluble ruthenium complex for use in forming a black color.

The ink set of the present invention can be used generate a wide range of colors on high temperature articles using ink jet printing technology, including intermediate colors, such as, for example, orange, red, green, blue and brown. The colors produced using the inks of the ink set according to the present invention are superior in terms of intensity when compared to colors produced from known high temperature inks for application using an ink jet printer. Moreover, the inks according to the present invention produce higher intensity colors with lower metal loading than such inks.

The inks of the ink set according to the present invention are particularly useful for generating complex multicolor designs on glazed ceramic tile that are produced in a single fast firing cycle. The ability to precisely control the combination of the inks using ink jet printing technology permits photographic-quality images to be rapidly generated on ceramic tiles using the ink set according to the present invention. Images acquired or generated using a computer, a digital camera, and/or a scanner, can rapidly be applied as images to a ceramic tile using an ink jet printer and the ink set according to the present invention.

The following examples are intended only to illustrate the invention and should not be construed as imposing limitations upon the claims:

EXAMPLE 1

Eleven transition metal solutions were each prepared by dissolving an appropriate amount of a transition metal complex (purchased from one or more of the suppliers noted in the specification above) in an appropriate amount of a proprietary aromatic hydrocarbon solvent available under the tradename HAN 8070 from Exxon Chemical of Houston, Tex., to obtain a solution having a final transition metal loading, by weight, as indicated in Table I below:

TABLE I

| Transition Metal | Metal Loading | Source |
| --- | --- | --- |
| Co | 7.2% | cobalt octanoate |
| Fe | 3.6% | iron octanoate |
| Ni | 10.0% | nickel 2-ethylhexanoate |
| Zn | 22.0% | zinc 2-ethylhexanoate |
| Bi | 24.0% | bismuth 2-ethylhexanoate |
| Ce | 10.0% | cerium 2-ethylhexanoate |
| Cr | 3.0% | chromium 2-ethylhexanoate |
| Mn | 7.2% | manganese 2-ethylhexanoate |
| Sn | 10.9% | dibutyl tin dilaurate |
| Ti | 14.0% | titanium n-butoxide |
| V | 4.0% | vanadium 2-ethylhexanoate |

Eleven inks were prepared from the eleven transition metal solutions shown in Table I above. The inks were prepared by mixing appropriate amounts of the transition metal solutions shown in Table I above in the the proper ratios (by weight) as shown in Table II. The inks were applied at a rate of about 2.7848 g/m$^2$ using a XaarJet 500 ink jet printhead manufactured by Xaar Technology Limited of Cambridge, England to a green (unfired) ceramic tile body to which a transparent glaze available under the trade designation FCE-671 from Ferro Corporation of Cleveland, Ohio had previously been applied by wet spraying and dried. Note: for this Example, an additional 4.0% TiO$_2$ (by weight of the standard glaze composition) was added to the standard glaze composition before it was applied to the ceramic tile.

After printing, the glazed ceramic tile was then fired in a conventional single fast firing cycle in a roller hearth kiln with maximum temperature of 1,120° C. in a one hour cold to cold cycle. The CIELAB color values were measured on the surface of the fired glazed ceramic tile where the individual inks were applied using an ACS SpectreFlash 600 spectrometer with a 10 degree observer and reported in Table II below:

TABLE II

| Ink | Metals in Ink | L* | a* | b* |
| --- | --- | --- | --- | --- |
| 1–1 | Co | 65.69 | 1.29 | −15.58 |
| 1–2 | 2 Co:1 Fe | 71.97 | −0.03 | −9.04 |
| 1–3 | 2 Co:1 Ni | 75.05 | −0.94 | −2.89 |
| 1–4 | 4 Co:1 Zn | 74.90 | −0.54 | −6.52 |
| 1–5 | 2 Co:1 Bi | 76.93 | −0.67 | −4.32 |
| 1–6 | 2 Co:1 Ce | 75.50 | −0.58 | −5.96 |
| 1–7 | 2 Co:1 Cr | 71.98 | −1.69 | 9.25 |
| 1–8 | 2 Co:1 Mn | 73.01 | −0.31 | −6.66 |
| 1–9 | 2 Co:1 Sn | 75.37 | −0.65 | −5.95 |
| 1–10 | 2 Co:1 Ti | 72.13 | −0.18 | −9.68 |
| 1–11 | 2 Co:1 V | 77.12 | −0.76 | −3.79 |

The L* value is a measure of the intensity or lightness of the color. The a* value is a measure of the redness (positive a*) and/or the greenness (negative a*) of the color. And, the b* value is a measure of the yellowness (positive b*) and/or blueness (negative b*) of the color. The results reported in Table II above show that an ink containing a cobalt complex only produces a slightly red-toned blue color, and that the addition of various other transition metals can be used to adjust the color from a red-toned blue to a true cyan. Example 1–7 shows, in particular, that the addition of chromium to a cobalt complex-based ink can be used to adjust the color from a blue to a greenish-yellow.

EXAMPLE 2

Five transition metal solutions were each prepared by dissolving an appropriate amount of a transition metal complex (purchased from one or more of the suppliers noted in the specification above) in an appropriate amount of a proprietary aromatic hydrocarbon solvent available under the tradename HAN 8070 from Exxon Chemical of Houston, Tex., to obtain a solution having a final transition metal loading, by weight, as indicated in Table III below:

TABLE III

| Transition Metal | Metal Loading | Source |
| --- | --- | --- |
| Au | 2.0% | gold resinate |
| Au | 8.0% | gold dodecylmercaptide |
| Cr | 3.0% | chromium 2-ethylhexanoate |
| Sn | 10.9% | dibutyl tin dilaurate |
| Zr | 3.6% | zirconium 2-ethylhexanoate |

Four inks were prepared from the five transition metal solutions shown in Table III above. The inks were prepared by mixing appropriate amounts of the transition metal solutions shown in Table III above in the proper ratios (by weight) as shown in Table IV. The inks were applied at a rate of about 2.7848 g/m² using a XaarJet 500 ink jet printhead manufactured by Xaar Technology Limited of Cambridge, England to a green (unfired) ceramic tile body to which a transparent glaze available under the trade designation FCE-671 from Ferro Corporation of Cleveland, Ohio had previously been applied by wet spraying and dried.

After printing, the glazed ceramic tile was then fired in a conventional single fast firing cycle in a roller hearth kiln with maximum temperature of 1,120° C. in a one hour cold to cold cycle. The CIELAB color values were measured on the surface of the fired glazed ceramic tile where the individual inks were applied using an ACS SpectreFlash 600 spectrometer with a 10 degree observer and reported in Table IV below:

TABLE IV

| Ink | Metals in Ink | $L^*$ | $a^*$ | $b^*$ |
|---|---|---|---|---|
| 2-1 | Au (2%) | 63.03 | 23.08 | −2.23 |
| 2-2 | 1 Au (8%):0.5 Cr:2 Sn:0.5 Zr | 55.17 | 28.52 | −1.83 |
| 2-3 | 1 Au (8%):0.5 Cr:2 Sn:1.5 Zr | 60.90 | 25.86 | −2.11 |
| 2-4 | 1 Au (8%):0.5 Cr:3.5 Sn | 60.17 | 25.96 | −2.15 |

The results reported in Table IV above show that an increase in the gold content of the ink increases the intensity of the color produced, and that the addition of various other transition metals can be used to modify the tone of the color.

EXAMPLE 3

Three transition metal solutions were each prepared by dissolving an appropriate amount of a transition metal complex (purchased from one or more of the suppliers noted in the specification above) in an appropriate amount of a proprietary aromatic hydrocarbon solvent available under the tradename HAN 8070 from Exxon Chemical of Houston, Tex., to obtain a solution having a final transition metal loading, by weight, as indicated in Table V below:

TABLE V

| Transition Metal | Metal Loading | Source |
|---|---|---|
| Ru | 6% | ruthenium octoate |
| Ru | 7% | ruthenium carbonyl |
| Co | 6% | cobalt 2-ethylhexanoate |
| Au | 2% | gold dodecylmercaptide |

Three inks were prepared from the four transition metal solutions shown in Table V above. The inks were prepared by mixing appropriate amounts of the transition metal solutions shown in Table V above in the the proper ratios (by weight) as shown in Table VI. The inks were applied at a rate of about 2.7848 g/m² using a XaarJet 500 ink jet printhead manufactured by Xaar Technology Limited of Cambridge, England to a green (unfired) ceramic tile body to which a transparent glaze available under the trade designation FCE-671 from Ferro Corporation of Cleveland, Ohio had previously been applied by wet spraying and dried.

After printing, the glazed ceramic tile was then fired in a conventional single fast firing cycle in a roller hearth kiln with maximum temperature of 1,120° C. in a one hour cold to cold cycle. The CIELAB color values were measured on the surface of the fired glazed ceramic tile where the individual inks were applied using an ACS SpectreFlash 600 spectrometer with a 10 degree observer and reported in Table VI below:

TABLE VI

| Ink | Metals in Ink | $L^*$ | $a^*$ | $b^*$ |
|---|---|---|---|---|
| 3-1 | 1 Ru (6%):2 Co (6%):2 Au (2%) | 41.34 | −2.47 | 6.96 |
| 3-2 | Ru (6%) | 45.51 | −1.78 | 7.76 |
| 3-3 | Ru (7%) | 38.90 | −0.96 | 6.88 |

The results reported in Table VI above show that a black is obtained with the use of ruthenium in an ink. Additional metals can be used to adjust the tone of the color obtained. The intensity of the color can be increased with an increase in the loading of ruthenium in the ink.

EXAMPLE 4

Five transition metal solutions were each prepared by dissolving an appropriate amount of a transition metal complex (purchased from one or more of the suppliers noted in the specification above) in an appropriate amount of a proprietary aromatic hydrocarbon solvent available under the tradename HAN 8070 from Exxon Chemical of Houston, Tex., to obtain a solution having a final transition metal loading, by weight, as indicated in Table VII below:

TABLE VII

| Transition Metal | Metal Loading | Source |
|---|---|---|
| Ce | 10.0% | cerium 2-ethylhexanoate |
| Cr | 3.0% | chromium 2-ethylhexanoate |
| Ti | 14% | titanium n-butoxide |
| Mo | 15.0% | molybdenum 2-ethylhexanoate |
| Sb | 10.0% | antimony n-butoxide |

Seventeen inks were prepared from the five transition metal solutions shown in Table VII above. The inks were prepared by mixing appropriate amounts of the transition metal solutions shown in Table VII above in the the proper ratios (by weight) as shown in Table VIII. The inks were applied at a rate of about 2.7848 g/m² using a XaarJet 500 ink jet printhead manufactured by Xaar Technology Limited of Cambridge, England to a green (unfired) ceramic tile body to which a transparent glaze available under the trade designation FCE-671 from Ferro Corporation of Cleveland, Ohio had previously been applied by wet spraying and dried. Table VII also shows whether any additional $TiO_2$ was added to the standard glaze composition.

After printing, the glazed ceramic tile was then fired in a conventional single fast firing cycle in a roller hearth kiln with maximum temperature of 1,120° C. in a one hour cold to cold cycle. The CIELAB color values were measured on the surface of the fired glazed ceramic tile where the individual inks were applied using an ACS SpectreFlash 600 spectrometer with a 10 degree observer and reported in Table VIII below:

TABLE VIII

| Ink | Metals in Ink | Added $TiO_2$ in Glaze | $L^*$ | $a^*$ | $b^*$ |
|---|---|---|---|---|---|
| 4-1 | 1 Cr: 3 Sb | — | 87.03 | −0.86 | 3.68 |
| 4-2 | 1 Cr: 3 Sb | 3.0% | 80.75 | 0.72 | 27.09 |
| 4-3 | 1 Cr: 3 Sb | 4.0% | 80.01 | 1.6 | 31.07 |
| 4-4 | 1 Cr: 3 Sb | 6.0% | 77.15 | 5.51 | 37.87 |

TABLE VIII-continued

| Ink | Metals in Ink | Added TiO$_2$ in Glaze | L* | a* | b* |
|---|---|---|---|---|---|
| 4-5 | 1 Cr: 3 Sb: 10 Ti | — | 86.91 | −1.09 | 4.02 |
| 4-6 | 1 Cr: 3 Sb: 10 Ti | 3.0% | 85.17 | −0.90 | 9.54 |
| 4-7 | 1 Cr: 3 Sb: 10 Ti | 4.0% | 83.54 | −1.19 | 17.19 |
| 4-8 | 1 Cr: 3 Sb: 10 Ti | 6.0% | 84.95 | −0.81 | 23.59 |
| 4-9 | 1 Cr: 1 Sb: 2 Mo | — | 85.94 | −2.44 | 7.14 |
| 4-10 | 1 Cr: 1 Sb: 2 Mo | 3.0% | 79.37 | 1.67 | 21.1 |
| 4-11 | 1 Cr: 1 Sb: 2 Mo | 4.0% | 72.58 | 6.43 | 32.24 |
| 4-12 | 1 Cr: 1 Sb: 1 Mo: 1 Ce | — | 86.15 | −1.82 | 5.98 |
| 4-13 | 1 Cr: 1 Sb: 1 Mo: 1 Ce | 3.0% | 80.67 | 0.87 | 20.14 |
| 4-14 | 1 Cr: 1 Sb: 1 Mo: 1 Ce | 4.0% | 77.77 | 2.99 | 28.18 |
| 4-15 | 1 Cr: 2 Ce: 1 Mo | — | 86.43 | −1.81 | 6.27 |
| 4-16 | 1 Cr: 2 Ce: 1 Mo | 3.0% | 82.68 | −1.05 | 16.87 |
| 4-17 | 1 Cr: 2 Ce: 1 Mo | 4.0% | 79.35 | 0.70 | 26.14 |

Inks 4-1 through 4-4 reported in Table VIII above show the effect of adding TiO$_2$ to the glaze when there is no titanium complex present in the ink. Inks 4-5 through 4-17 reported in Table VIII show the effect of adding titanium in the ink and /or in the glaze, and the effect of other metals on the yellowness of the color produced.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. An ink set for use in decorating the glazed surface of an article using an ink jet printer, the ink set comprising at least three separate inks containing soluble transition metal complexes that upon heating to a temperature of greater than about 300° C. decompose to form colored oxides and/or colored combinations with one or more materials of the glaze, a first ink of the ink set comprising a soluble cobalt complex for use in forming a cyan color, a second ink of the ink set comprising a soluble gold complex for use in forming a magenta color, and a third ink of the ink set comprising a soluble transition metal complex for use in forming a yellow color.

2. The ink set as in claim 1 wherein the first ink further comprises a soluble complex of one or more transition metals selected from the group consisting of bismuth, cerium, chromium, copper, iron, manganese, nickel, praseodymium, tin, titanium, vanadium, zinc, and zirconium.

3. The ink set as in claim 1 wherein the second ink further comprises a soluble complex of one or more transition metals selected from the group consisting of aluminum, antimony, bismuth, chromium, copper, iron, manganese, molybdenum, nickel, silicon, tin, titanium, tungsten, vanadium, yttrium, zinc and zirconium.

4. The ink set as in claim 1 wherein the third ink comprises a soluble praseodymium complex.

5. The ink set as in claim 4 wherein the third ink further comprises a soluble zirconium complex.

6. The ink set as in claim 4 wherein the third ink further comprises a soluble complex of one or more transition metals selected from the group consisting of antimony, cerium, chromium, iron, lead, molybdenum, nickel, niobium, tin, titanium, tungsten, vanadium, zinc, and zirconium.

7. The ink set as in claim 1 wherein the third ink comprises a blend of soluble chromium and antimony complexes.

8. The ink set as in claim 7 wherein the third ink further comprises a soluble titanium complex.

9. The ink set as in claim 7 wherein the third ink further comprises a soluble complex of one or more transition metals selected from the group consisting of cerium, iron, lead, manganese, molybdenum, nickel, niobium, praseodymium, tin, titanium, tungsten, vanadium, yttrium, zinc, and zirconium.

10. The ink set as in claim 1 wherein the third ink comprises a blend of soluble nickel and antimony complexes.

11. The ink set as in claim 10 wherein the third ink further comprises a soluble titanium complex.

12. The ink set as in claim 10 wherein the third ink further comprises a soluble complex of one or more transition metals selected from the group consisting of cerium, chromium, iron, lead, manganese, molybdenum, niobium, praseodymium, tin, titanium, tungsten, vanadium, yttrium, zinc, and zirconium.

13. The ink set as in claim 1 wherein the soluble transition metal complexes comprise one or more compounds selected from the group consisting of carboxylates, alkoxides, β-diketonates, chelates, resinates, carbonyls, mercaptans, phosphines, amines, and amides.

14. The ink set as in claim 13 wherein the soluble transition metal complex of the first ink comprises a water insoluble cobalt carboxylate containing 5 to 22 carbon atoms.

15. The ink set as in claim 13 wherein the soluble transition metal complex of the second ink comprises one or more selected from the group consisting of gold dodecylmercaptide, gold resinates, gold resinate mercaptans, gold acetylacetonate, gold phosphines, and colloidal gold dispersions.

16. The ink set as in claim 13 wherein the soluble transition metal complex of the third ink comprises a water insoluble praseodymium carboxylate containing 5 to 22 carbon atoms.

17. The ink set as in claim 13 wherein the soluble transition metal complex of the third ink comprises a blend of a water insoluble chromium carboxylate containing 5 to 22 carbon atoms and a water insoluble antimony alkoxide or carboxylate containing 5 to 22 carbon atoms.

18. The ink set as in claim 13 wherein the soluble transition metal complex of the third ink comprises a blend of a water insoluble chromium carboxylate containing 5 to 22 carbon atoms, triphenyl antimony, and a titanium alkoxide.

19. The ink set as in claim 13 wherein the soluble transition metal complex of the third ink comprises a blend of a water insoluble nickel carboxylate containing 5 to 22 carbon atoms and a water insoluble antimony carboxylate containing 5 to 22 carbon atoms.

20. The ink set as in claim 13 wherein the soluble transition metal complex of the third ink comprises a blend of a water insoluble nickel carboxylate containing 5 to 22 carbon atoms, triphenyl antimony, and a titanium alkoxide.

21. The ink set as in claim 1 wherein each separate ink further comprises one or more solvents selected from the group consisting of aromatic hydrocarbons, unsaturated hydrocarbons, water, saturated hydrocarbons, fractions of petroleum distillates, cyclic saturated hydrocarbons, ethers, esters, ketones, alcohols, nitrites, halogenated hydrocarbons, and dimethylsulfoxide.

22. The ink set as in claim 21 wherein said solvent comprises one or more selected from the group consisting of paraffins, isoparaffins, napthenics, and fractions of petroleum distillates.

23. The ink set as in claim 1 wherein each separate ink has a viscosity of from about 5 to about 50 centipoise.

24. The ink set as in claim 1 wherein each separate ink has a surface tension of from about 20 to about 40 mN/m.

25. The ink set as in claim 1 wherein each separate ink has a density of from about 0.6 to about 2.5 g/mL.

26. The ink set as in claim 1 further comprising a fourth ink comprising a soluble ruthenium complex for use in forming a black color.

27. The ink set as in claim 26 wherein the fourth ink further comprises a soluble complex of one or more transition metals selected from the group consisting of antimony, chromium, cobalt, copper, gold, iridium, iron, manganese, molybdenum, nickel, palladium, platinum, tin, titanium, tungsten, and vanadium.

28. The ink set as in claim 26 wherein the soluble ruthenium complex of the fourth ink comprises one or more compounds selected from the group consisting of carboxylates, alkoxides, β-diketonates, chelates, carbonyls, phosphines, amines and resinates.

29. The ink set as in claim 28 wherein the soluble ruthenium coordination complex of the fourth ink comprises a ruthenium carboxylate containing 5 to 22 carbon atoms.

30. The ink set as in claim 26 wherein said fourth ink further comprises one or more solvents selected from the group consisting of aromatic hydrocarbons, unsaturated hydrocarbons, water, saturated hydrocarbons, fractions of petroleum distillates, cyclic saturated hydrocarbons, ethers, esters, ketones, alcohols, nitrites, halogenated hydrocarbons, and dimethylsulfoxide.

31. The ink set as in claim 30 wherein said solvent comprises one or more selected from the group consisting of paraffins, isoparaffins, napthenics, turpentine, and fractions of petroleum distillates.

32. The ink set as in claim 26 wherein said fourth ink has a viscosity of from about 5 to about 50 centipoise.

33. The ink set as in claim 26 wherein said fourth ink has a surface tension of from about 20 to about 40 mN/m.

34. The ink set as in claim 26 wherein said fourth ink has a density of from about 0.6 to about 2.5 g/mL.

35. A method of decorating a glazed surface of an article with an ink jet printer comprising:
   providing an ink set comprising at least a first ink comprising a soluble cobalt complex for use in forming a cyan color, a second ink comprising a soluble gold complex for use in forming a magenta color, and a third ink comprising a soluble transition metal complex for use in forming a yellow color;
   applying the inks from the ink set to the glazed surface of the article using an ink jet printer, at least two of the inks being applied at or near the same point on the glazed surface of the article where an intermediate color is desired; and
   heating the printed article to a temperature of greater than 300° C. to melt the glaze and form the desired colors.

36. The method of claim 35 wherein the ink set further includes a fourth ink comprising a soluble ruthenium complex for use in forming a black color.

37. The method of claim 35 wherein the third ink of the ink set comprises a soluble praseodymium complex and the glazed surface of the article contains $ZrO_2$ and/or $ZrSiO_2$.

38. The method of claim 35 wherein the third ink of the ink set comprises a blend of soluble praseodymium and zirconium complexes.

39. The method of claim 35 wherein the third ink of the ink set comprises a blend of soluble chromium and antimony complexes and the glazed surface of the article contains $TiO_2$.

40. The method of claim 35 wherein the third ink of the ink set comprises a blend of soluble chromium, antimony, and titanium complexes.

41. The method of claim 35 wherein the third ink of the ink set comprises a blend of soluble nickel and antimony complexes and the glazed surface of the article contains $TiO_2$.

42. The method of claim 35 wherein the third ink of the ink set comprises a blend of soluble nickel, antimony, and titanium complexes.

43. The method of claim 35 wherein the article comprises a ceramic body.

44. The method of claim 43 wherein the ceramic body comprises an architectural tile.

45. An article having a decoration applied to at least one glazed surface thereof, the decoration being formed using an ink jet printer and an ink set comprising at least three separate inks containing soluble transition metal complexes that upon heating to a temperature of greater than about 300° C. decompose to form colored oxides and/or colored combinations with one or more materials of the glaze, a first ink of the ink set comprising a soluble cobalt complex for use in forming a cyan color, a second ink of the ink set comprising a soluble gold complex for use in forming a magenta color, and a third ink of the ink set comprising a soluble transition metal complex for use in forming a yellow color.

46. The article as in claim 45 wherein the decoration was acquired or generated using a computer, a digital camera, and/or a scanner.

47. An ink for use in forming a decoration on a glazed surface of an article that is to be heated to a temperature of greater than 300° C., said ink comprising a soluble cobalt complex and one or more solvents selected from the group consisting of aromatic hydrocarbons, unsaturated hydrocarbons, saturated hydrocarbons, fractions of petroleum distillates, cyclic saturated hydrocarbons, ethers, esters, alcohols, and nitriles, said ink being water immiscible.

48. The ink as in claim 47 wherein said ink further comprises a soluble complex of one or more transition metals selected from the group consisting of bismuth, cerium, chromium, copper, iron, manganese, nickel, praseodymium, tin, titanium, vanadium, zinc, and zirconium.

49. An ink for use in forming a decoration on a glazed surface of an article that is to be heated to a temperature of greater than 300° C., said ink comprising a soluble praseodymium complex and one or more solvents selected from the group consisting of aromatic hydrocarbons, unsaturated hydrocarbons, saturated hydrocarbons, fractions of petroleum distillates, cyclic saturated hydrocarbons, ethers, esters, alcohols, and nitriles, said ink being water immiscible.

50. The ink as in claim 49 wherein said ink further comprises a soluble complex of one or more transition metals selected from the group consisting of antimony, cerium, chromium, iron, lead, molybdenum, nickel, niobium, tin, titanium, tungsten, vanadium, zinc, and zirconium.

51. An ink for use in forming a decoration on a glazed surface of an article that is to be heated to a temperature of greater than 300° C., said ink comprising a blend of soluble chromium and antimony complexes.

52. The ink as in claim 51 wherein said ink further comprises a soluble complex of one or more transition metals selected from the group consisting of cerium, iron, lead, manganese, molybdenum, nickel, niobium, praseodymium, tin, titanium, tungsten, vanadium, yttrium, zinc, and zirconium.

53. An ink for use in forming a decoration on a glazed surface of an article that is to be heated to a temperature of greater than 300° C., said ink comprising a blend of soluble nickel and antimony complexes.

54. The ink as in claim 53 wherein said ink further comprises a soluble complex of one or more transition metals selected from the group consisting of cerium, chromium, iron, lead, manganese, molybdenum, niobium, praseodymium, tin, titanium, tungsten, vanadium, yttrium, zinc, and zirconium.

55. An ink for use in forming a decoration on a glazed surface of an article that is to be heated to a temperature of greater than 300° C., said ink comprising a soluble ruthenium complex and one or more solvents selected from the group consisting of aromatic hydrocarbons, unsaturated hydrocarbons, saturated hydrocarbons, fractions of petroleum distillates, cyclic saturated hydrocarbons, ethers, esters, alcohols, and nitriles, said ink being water immiscible.

56. The ink as in claim 55 wherein said ink further comprises a soluble complex of one or more transition metals selected from the group consisting of antimony, chromium, cobalt, copper, gold, iridium, iron, manganese, molybdenum, nickel, palladium, platinum, tin, titanium, tungsten, and vanadium.

* * * * *